US009683355B2

(12) United States Patent
Cole

(10) Patent No.: US 9,683,355 B2
(45) Date of Patent: Jun. 20, 2017

(54) AIR ADMITTANCE VALVE

(71) Applicant: IPS Corporation, Collierville, TN (US)

(72) Inventor: Steven R. Cole, Collierville, TN (US)

(73) Assignee: IPS Corporation, Collierville, TN (US)

( * ) Notice: Subject to any disclaimer, the term of this patent is extended or adjusted under 35 U.S.C. 154(b) by 316 days.

(21) Appl. No.: 14/263,326

(22) Filed: Apr. 28, 2014

(65) Prior Publication Data

US 2015/0308090 A1 Oct. 29, 2015

(51) Int. Cl.
*E03C 1/122* (2006.01)
(52) U.S. Cl.
CPC ....... *E03C 1/1225* (2013.01); *Y10T 137/7897* (2015.04)
(58) Field of Classification Search
CPC ... E03C 1/1225; F16K 24/06; Y10T 137/7897
See application file for complete search history.

(56) References Cited

U.S. PATENT DOCUMENTS

| 35,535 A | 6/1862 | Merrill et al. |
| 209,975 A * | 11/1878 | Morey ............... E03C 1/295 137/216.2 |
| D23,233 S | 5/1894 | Horan |
| D23,235 S | 5/1894 | Wood |
| 1,739,430 A | 12/1929 | Webster |
| 2,520,771 A | 8/1950 | Martin et al. |
| 2,704,996 A | 3/1955 | Peterson et al. |
| 2,928,413 A | 3/1960 | Hansen |
| 3,073,339 A | 1/1963 | Stelzer |
| 3,791,401 A * | 2/1974 | Gorman .............. F16K 24/02 137/216.2 |

(Continued)

FOREIGN PATENT DOCUMENTS

| EP | 0 409 506 A1 | 1/1991 |
| EP | 1 313 975 A1 | 5/2003 |

(Continued)

OTHER PUBLICATIONS

International Search Report and Written Opinion for corresponding International Application No. PCT/IB2015/053061, mailed Jun. 30, 2015.

(Continued)

*Primary Examiner* — Marina Tietjen
*Assistant Examiner* — Frederick D Soski
(74) *Attorney, Agent, or Firm* — Alston & Bird LLP

(57) ABSTRACT

An air admittance valve which when subjected to a negative pressure condition vents a pipe system to an ambient environment. Generally, the air admittance valve includes a housing, a cartridge, and a sealing member. The housing includes one or more vents disposed in its wall and may be engaged with the pipe system at one end. The cartridge may have one or more inlets defining one or more inlet openings, where the one or more inlets are connected to a central chamber that has an opening with a sealing structure. The sealing member interacts with the sealing structure of the cartridge to allow one-way airflow from the central chamber to the pipe system. The cartridge and sealing member may be inserted into the housing such that the one or more inlet openings substantially align with the one or more vents in the housing.

14 Claims, 12 Drawing Sheets

(56) References Cited

U.S. PATENT DOCUMENTS

| | | |
|---|---|---|
| 3,923,081 A | 12/1975 | Persson |
| 3,941,151 A | 3/1976 | Biddle |
| 4,232,706 A | 11/1980 | Ericson |
| 4,273,153 A * | 6/1981 | Brown ............... B63J 2/10 |
| | | 137/454.5 |
| 4,436,107 A | 3/1984 | Persson |
| 4,493,339 A | 1/1985 | Porter, Jr. |
| 4,518,014 A * | 5/1985 | McAlpine ............ E03C 1/122 |
| | | 137/526 |
| 4,535,807 A | 8/1985 | Ericson |
| 4,545,398 A | 10/1985 | Van Olst |
| 4,556,084 A | 12/1985 | Frawley |
| 4,867,802 A | 9/1989 | Earl |
| 4,962,548 A | 10/1990 | Van Deventer et al. |
| 4,974,632 A | 12/1990 | Ericson |
| 4,991,623 A | 2/1991 | Ericson |
| 5,048,562 A | 9/1991 | Frawley |
| 5,273,068 A * | 12/1993 | Duren ............... E03C 1/122 |
| | | 137/516.15 |
| 5,419,366 A | 5/1995 | Johnston |
| 5,441,679 A | 8/1995 | Chalich |
| RE35,532 E | 6/1997 | Duren |
| 5,706,854 A | 1/1998 | Haynes |
| 5,803,112 A * | 9/1998 | Andersson ........... E03C 1/108 |
| | | 137/217 |
| 5,881,759 A | 3/1999 | Andersson |
| 5,913,330 A | 6/1999 | Jones et al. |
| 5,971,014 A * | 10/1999 | Duren ............... E03C 1/12 |
| | | 137/526 |
| 5,983,929 A | 11/1999 | Andersson |
| D427,286 S | 6/2000 | Ballanco |
| 6,234,198 B1 | 5/2001 | Chalich |
| 6,308,731 B1 | 10/2001 | Kawasaki |
| 6,415,816 B1 | 7/2002 | Beckey et al. |
| 6,532,988 B1 | 3/2003 | Ericson |
| 6,557,825 B2 | 5/2003 | Stone et al. |
| 6,799,600 B2 | 10/2004 | O'Neal |
| 7,025,092 B2 | 4/2006 | Swaffield et al. |
| D522,616 S | 6/2006 | Minnick et al. |
| 7,270,146 B1 | 9/2007 | Johnston et al. |
| 7,373,953 B2 | 5/2008 | Minnick |
| 7,395,835 B1 * | 7/2008 | Gohlke ............... E03C 1/12 |
| | | 137/526 |
| 7,410,608 B1 | 8/2008 | Gohlke |
| 7,422,030 B2 | 9/2008 | Stone |
| 7,445,022 B2 | 11/2008 | McCoy |
| 7,699,076 B2 | 4/2010 | Minnick |
| 7,908,685 B2 | 3/2011 | Ericson |
| 8,136,548 B2 | 3/2012 | Trueb |
| 8,360,105 B2 | 1/2013 | Cashen et al. |
| 8,448,663 B2 * | 5/2013 | Jakubowski ......... F16K 15/063 |
| | | 137/526 |
| 8,555,923 B1 | 10/2013 | Minnick |
| 8,567,434 B2 | 10/2013 | Ericson et al. |
| 2003/0221727 A1 | 12/2003 | O'Neal |
| 2005/0150037 A1 | 7/2005 | Cornwall |
| 2006/0011239 A1 | 1/2006 | Stone |
| 2006/0191576 A1 | 8/2006 | McCoy |
| 2006/0237678 A1 | 10/2006 | Lackey |
| 2010/0139788 A1 | 6/2010 | Lackey |
| 2012/0025123 A1 | 2/2012 | Ericson et al. |
| 2012/0261006 A1 * | 10/2012 | Cashen ............... F16K 24/06 |
| | | 137/488 |

FOREIGN PATENT DOCUMENTS

| | | |
|---|---|---|
| EP | 1 524 372 A1 | 4/2005 |
| EP | 1 650 363 A1 | 4/2006 |
| EP | 1 650 363 A2 | 4/2006 |
| FR | 2 816 025 A1 | 5/2002 |
| GB | 1002865 A | 9/1965 |
| GB | 2 421 518 A | 6/2006 |
| JP | H 11-325289 | 11/1999 |
| JP | 2000-257734 A | 9/2000 |
| PL | 62447 Y | 7/2006 |
| WO | WO 2007/122774 | 11/2007 |
| WO | WO 2008/101295 A1 | 8/2008 |
| WO | WO 2011/063960 A1 | 6/2011 |

OTHER PUBLICATIONS

First Examination Report for corresponding New Zealand Application No. 725616 dated Mar. 29, 2017.

* cited by examiner

AIR ADMITTANCE VALVE

TECHNICAL FIELD OF THE INVENTION

The present invention relates to air ventilation devices for use in pipe systems, and, more particularly, to air admittance valves used to vent pipe systems to the ambient environment.

BACKGROUND

In general, air admittance valves are used in plumbing systems as an alternative to vent systems that require venting through a complicated pipe system and/or rooftop vent system. Air admittance valves are one-way mechanical valves that may be located in a ventilated space to alleviate a need to connect to a central vertical vent (or to provide a separate vertical vent) that passes through the roof of a structure. Air admittance valves are normally closed, but open during a negative pressure condition, such as when wastewater is released. This allows air to enter the plumbing system and facilitate drainage. Once the flow of the wastewater ceases, the valve closes and remains closed until another negative pressure condition occurs. In such a manner, odors are prevented from escaping from the vent system.

Many air admittance valves are overly complex, have high part counts, and require expensive equipment and adhesives to assemble. There is a need for an improved air admittance valve that is easier and less expensive to manufacture, and that provides better performance over previous designs.

BRIEF SUMMARY OF THE INVENTION

Air admittance valves, such as for ventilating a plumbing system, are therefore provided having an improved, cost effective design. In this regard, an air admittance valve is provided that may be configured, when subjected to a negative pressure condition, to vent a pipe system to an ambient environment. In some embodiments, the air admittance valve may include a housing having at least one vent disposed in a wall of the housing. The housing may be configured to be engaged with the pipe system at a first end.

In some embodiments, the air admittance valve may include a cartridge having at least one inlet defining at least one inlet opening. The at least one inlet may be connected to a central chamber. The cartridge may define an opening of the central chamber having a sealing structure.

In some embodiments, the air admittance valve may include a sealing member defining a sealing surface. The sealing member may be configured to move between a closed position and an open position. The sealing surface may be configured to interact with the sealing structure of the cartridge to allow one-way airflow from the central chamber to the pipe system.

In some embodiments, the cartridge may be configured to be inserted within the housing, such that the at least one inlet opening may be configured to substantially align with the at least one vent in the housing. In some embodiments, the cartridge may be removable such that the cartridge may be configured to be replaced without damaging or disassembling the housing.

In some embodiments, the sealing member may further include a guide portion and the housing further defines a seal guide. The seal guide may be configured to movably engage the guide portion.

In some embodiments, the air admittance valve may include at least one gasket configured to be disposed between the cartridge and the housing to prevent airflow from bypassing the inlet of the cartridge.

In some embodiments, the air admittance valve may include an internal communication wall configured to align the cartridge with an interior of the housing. The air admittance valve may define an end chamber between the cartridge and a second end of the housing when the cartridge is disposed within the housing. The internal communication wall may define at least one opening such that the internal communication wall may be configured to fluidly connect the end chamber with the pipe system.

In some embodiments, the air admittance valve may include a central post within the central chamber configured to restrict the movement of the sealing member into the central chamber when subjected to a positive pressure from the pipe system.

Some embodiments of the air admittance valve may include a locating feature on the cartridge and a corresponding locating slot on the housing configured to guide the cartridge into alignment with the at least one vent during insertion of the cartridge into the housing. Some embodiments of the air admittance valve may include a positioning feature on the cartridge and a corresponding positioning feature on the housing configured to hold the cartridge in alignment with the at least one vent after insertion of the cartridge into the housing.

In some embodiments, the cartridge of the air admittance valve may include a duct wall that defines the central chamber in an interior of the duct wall. The cartridge may further include at least one inlet tube defining the at least one inlet, such that the at least one inlet tube spans between the at least one vent of the housing and the duct wall when the cartridge is inserted within the housing. The air admittance valve may define a void between the duct wall and an inner wall of the housing in fluid communication with an end chamber and the pipe system. The void may only be in fluid communication with the inlet and central chamber when the sealing member is in the open position. In some embodiments, the cartridge may define an inner duct wall and a concentric outer duct wall. An interior of the inner duct wall may define the central chamber. The at least one inlet opening may be defined in an outer surface of the outer duct wall and the at least one inlet may connect the outer surface of the outer duct wall with the central chamber, such that the outer surface of the outer duct wall may be in fluid communication with the central chamber. The air admittance valve may define a void between the inner duct wall and the outer duct wall in fluid communication with an end chamber and the pipe system, and the void may only be in fluid communication with the inlet and central chamber when the sealing member is in the open position.

In some embodiments, the cartridge may define at least one curved surface configured to direct airflow from the at least one inlet toward the sealing member. The at least one curved surface may be defined on a bottom surface of the central chamber proximate the at least one inlet.

In another embodiment of the present invention, a cartridge may be provided for an air admittance valve. The cartridge may include at least one inlet defining at least one inlet opening. The at least one inlet may be connected to a central chamber, and an opening of the central chamber may include a sealing structure. In some embodiments, the sealing structure of the cartridge may be configured to interact with a sealing surface of a sealing member to allow one-way airflow from the central chamber to the pipe system. The cartridge may be configured to be disposed within a housing having at least one vent, such that the at least one inlet opening of the cartridge is configured to substantially align with the at least one vent in the housing.

In some embodiments, the cartridge may include at least one gasket configured to be disposed between the cartridge and the housing to prevent airflow from bypassing the inlet of the cartridge. The cartridge may include an internal communication wall configured to align the cartridge with an interior of the housing. In some embodiments, an end chamber may be defined between the cartridge and a second end of the housing when the cartridge is disposed within the housing. The internal communication wall may define at least one opening such that the internal communication wall may be configured to fluidly connect the end chamber with the pipe system.

In some embodiments, the cartridge may include a central post within the central chamber configured to restrict the movement of the sealing member into the central chamber when subjected to a positive pressure from the pipe system.

Some embodiments of the cartridge may include a locating feature on the cartridge configured to engage a corresponding locating slot on the housing and configured to guide the cartridge into alignment with the at least one vent during insertion of the cartridge into the housing. Some embodiments of the cartridge may include a positioning feature on the cartridge configured to engage a corresponding positioning feature on the housing and configured to hold the cartridge in alignment with the at least one vent after insertion of the cartridge into the housing.

In some embodiments, the cartridge includes a duct wall that defines the central chamber in an interior of the duct wall. The cartridge may include at least one inlet tube defining the at least one inlet, such that the at least one inlet tube may be configured to span between the at least one vent of the housing and the duct wall when the cartridge is inserted within the housing. In some embodiments, the cartridge may be configured to define a void between the duct wall and an inner wall of the housing in fluid communication with an end chamber and the pipe system when the cartridge is inserted into the housing. The void may only be in fluid communication with the inlet and central chamber when the sealing member is in the open position. In some embodiments, the cartridge may define an inner duct wall and a concentric outer duct wall, wherein an interior of the inner duct wall defines the central chamber. The at least one inlet opening may be defined in an outer surface of the outer duct wall and the at least one inlet may connect the outer surface of the outer duct wall with the central chamber, such that the outer surface of the outer duct wall may be in fluid communication with the central chamber. In some embodiments, the cartridge may define a void between the inner duct wall and the outer duct wall configured to be in fluid communication with an end chamber and the pipe system when the cartridge is inserted into the housing, and the void may only be in fluid communication with the inlet and central chamber when the sealing member is in the open position.

In some embodiments, the cartridge may define at least one curved surface configured to direct airflow from the at least one inlet toward the sealing member. The at least one curved surface may be defined on a bottom surface of the central chamber proximate the at least one inlet.

In yet another embodiment of the present invention, a method for assembling an air admittance valve is provided. The method may include providing a housing configured to engage a pipe system at a first end having at least one vent disposed in a wall of the housing. The method may include inserting a sealing member having a sealing surface into the housing. In some embodiments, the method may include inserting a cartridge having at least one inlet defining at least one inlet opening into the housing, such that the at least one inlet opening substantially aligns with the at least one vent in the housing. The at least one inlet may be connected to a central chamber having an opening defining a sealing structure. The sealing surface of the sealing member may be configured to interact with the sealing structure of the cartridge to allow one-way airflow from the central chamber to the pipe system.

In some embodiments, the sealing member may include a guide portion and the housing further defines a seal guide. The seal guide may be configured to movably engage the guide portion.

In some embodiments, the method may include locating at least one gasket between the cartridge and the housing to prevent airflow from bypassing the inlet of the cartridge.

In some embodiments, the cartridge may include an internal communication wall configured to align the cartridge with an interior of the housing. In some embodiments, an end chamber may be defined between the cartridge and a second end of the housing when the cartridge is disposed within the housing. The internal communication wall may define at least one opening such that the internal communication wall may be configured to fluidly connect the end chamber with the pipe system.

In some embodiments, the cartridge may include a central post within the central chamber configured to restrict the movement of the sealing member into the central chamber when subjected to a positive pressure from the pipe system.

In some embodiments, the cartridge may include a locating feature configured to engage a corresponding locating slot on the housing and configured to guide the cartridge into alignment with the at least one vent during insertion of the cartridge into the housing. In some embodiments, the cartridge may include a positioning feature configured to engage a corresponding positioning feature on the housing and configured to hold the cartridge in alignment with the at least one vent after insertion of the cartridge into the housing.

In some embodiments, the cartridge may include a duct wall that defines the central chamber in an interior of the duct wall. The cartridge may also include at least one inlet tube defining the at least one inlet, such that the at least one inlet tube may be configured to span between the at least one vent of the housing and the duct wall when the cartridge is inserted within the housing.

In some embodiments of the method, inserting the cartridge into the housing may define a void between the duct wall and an inner wall of the housing in fluid communication with an end chamber and the pipe system. The void may only be in fluid communication with the inlet and central chamber when the sealing member is in the open position. In some embodiments, the cartridge may include an inner duct wall and a concentric outer duct wall. An interior of the inner duct wall may define the central chamber. The at least one inlet opening may be defined in an outer surface of the outer duct wall, and the at least one inlet may connect the outer surface of the outer duct wall with the central chamber, such that the outer surface of the outer duct wall is in fluid communication with the central chamber. In some embodiments, the cartridge includes a void between the inner duct wall and the outer duct wall in fluid communication with an end chamber and the pipe system. The void may only be in fluid communication with the inlet and central chamber when the sealing member is in the open position.

BRIEF DESCRIPTION OF THE DRAWINGS

Figure 1:
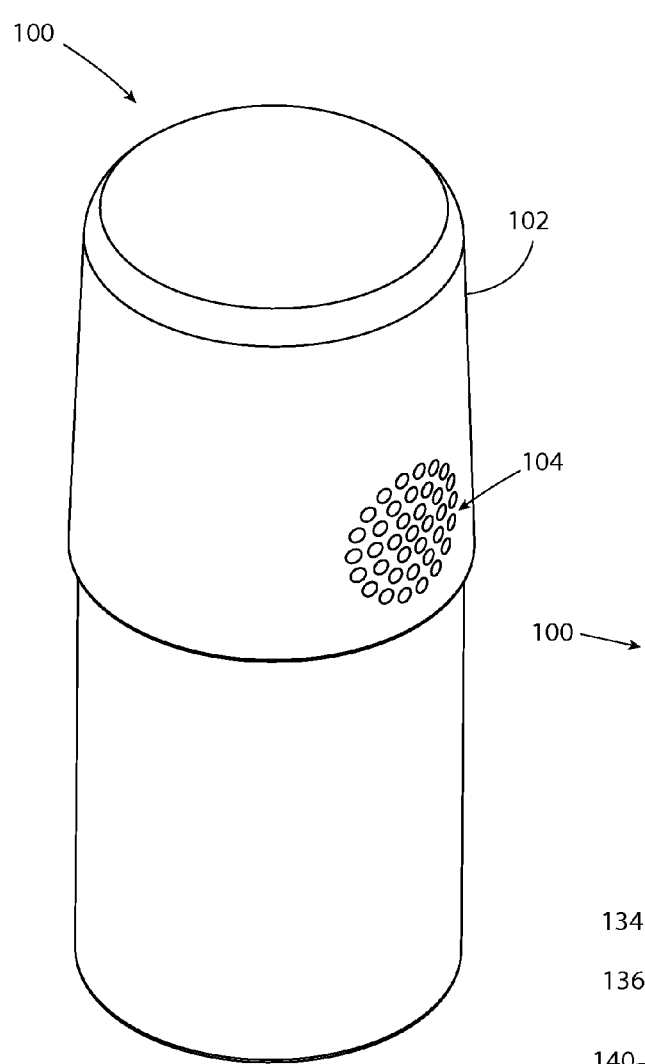
Figure 2:
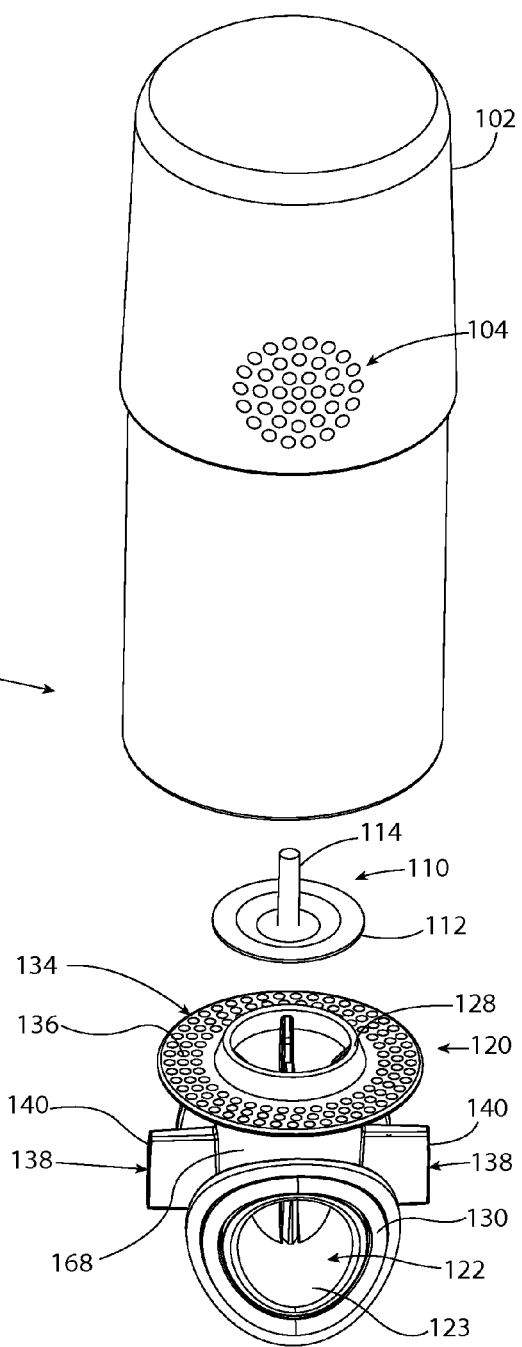
Figures 3, 4:
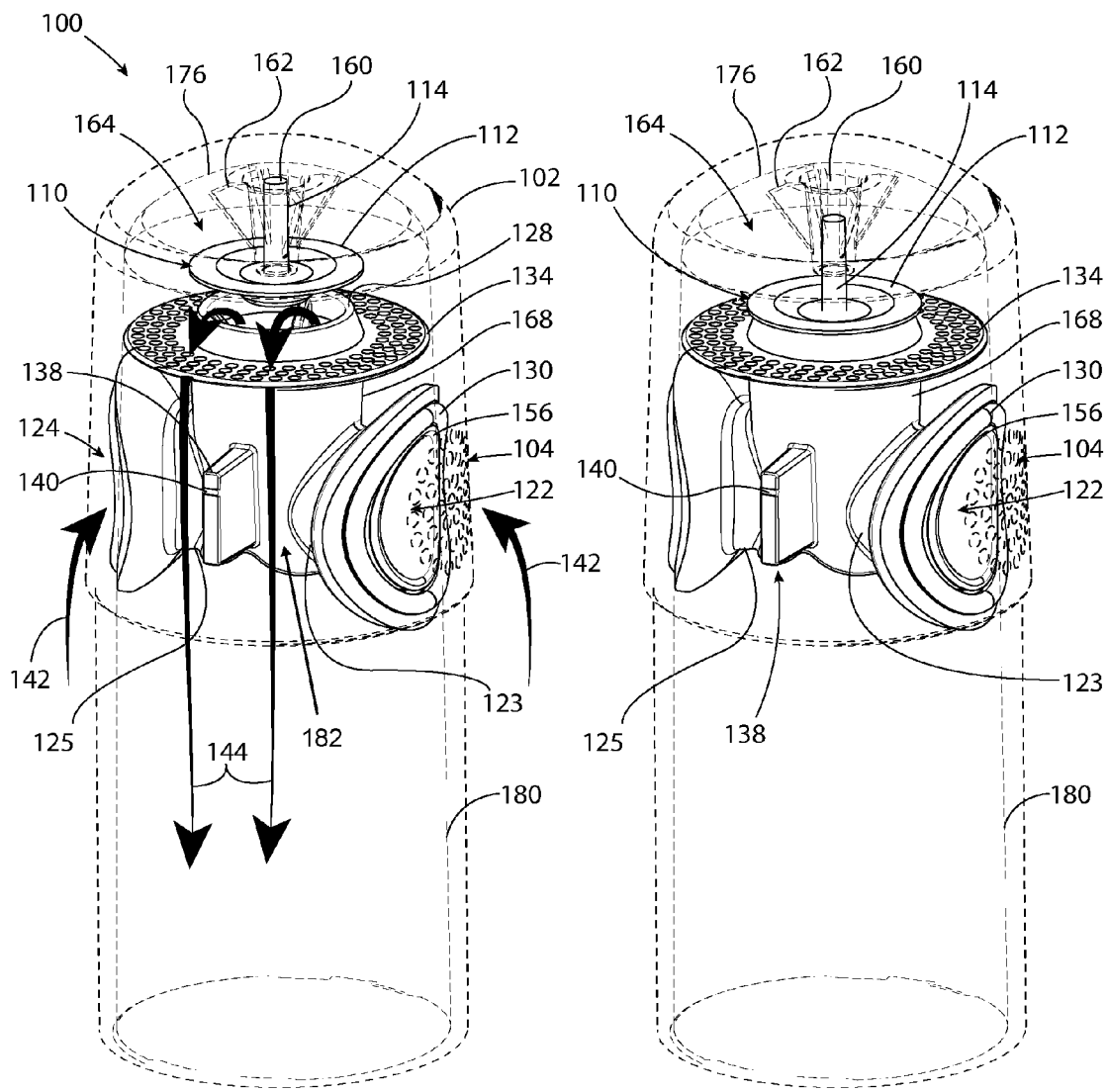
Figures 5, 6:
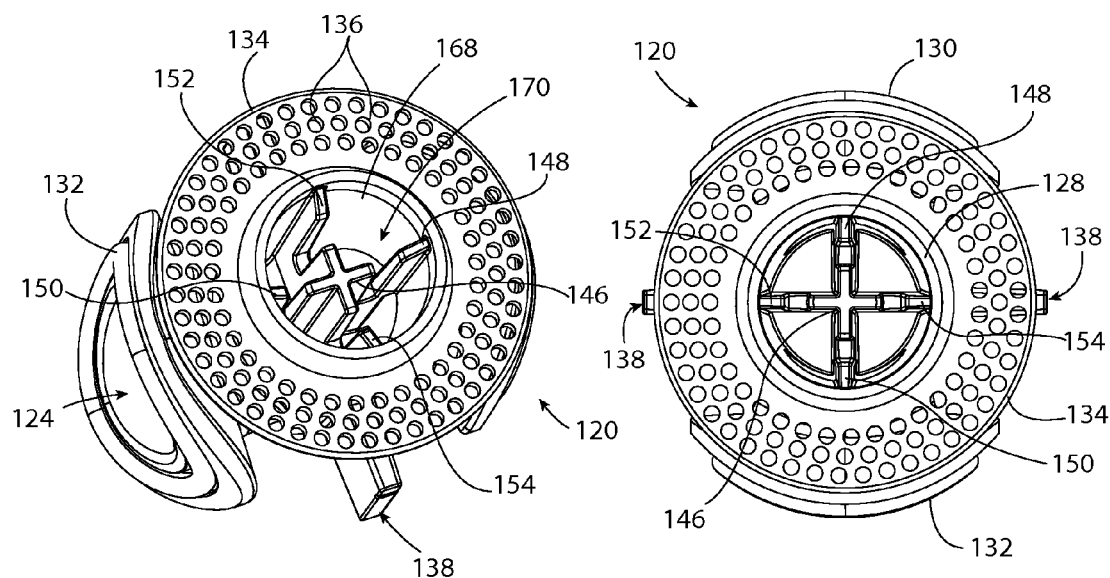
Figure 7:
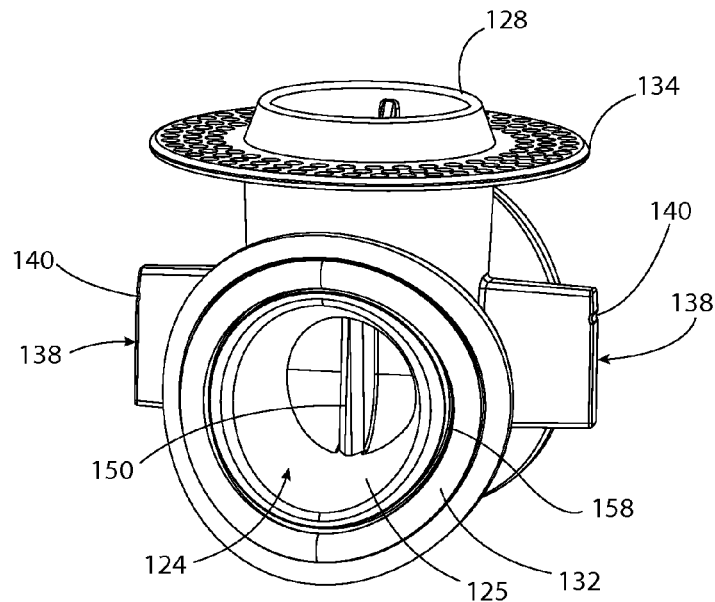
Figures 8A, 8B:
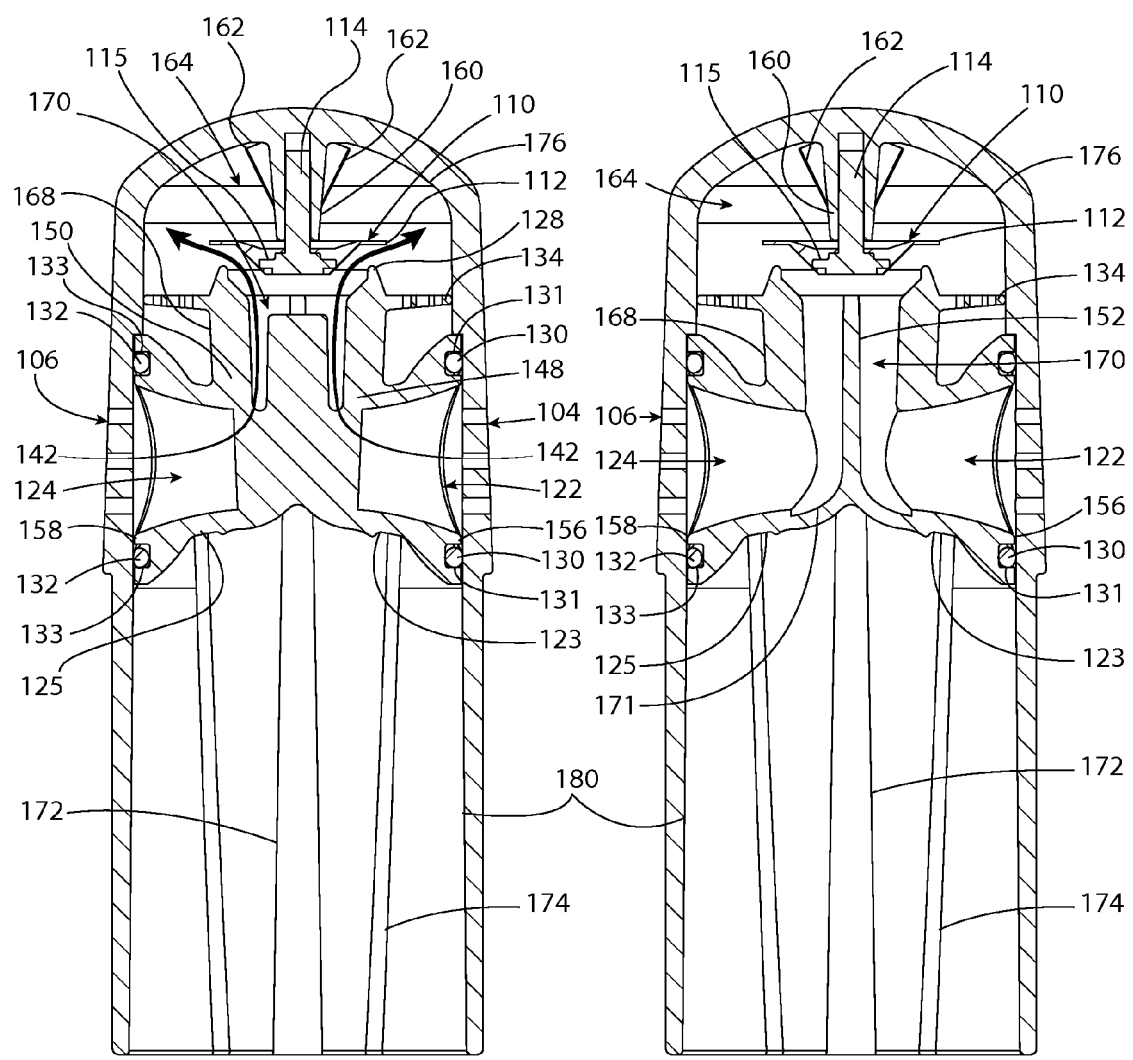
Figure 9:
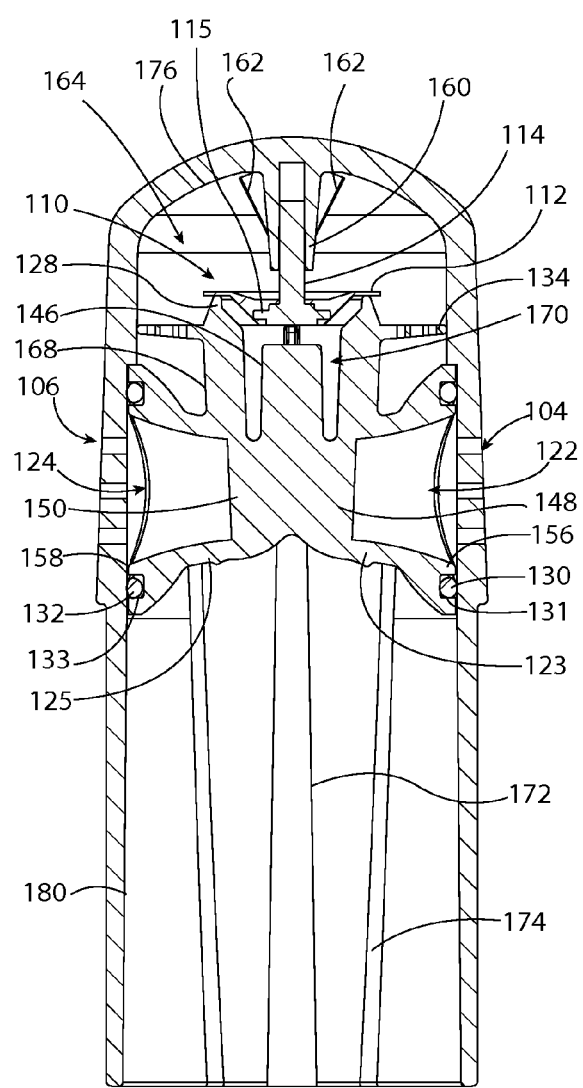
Figure 10:
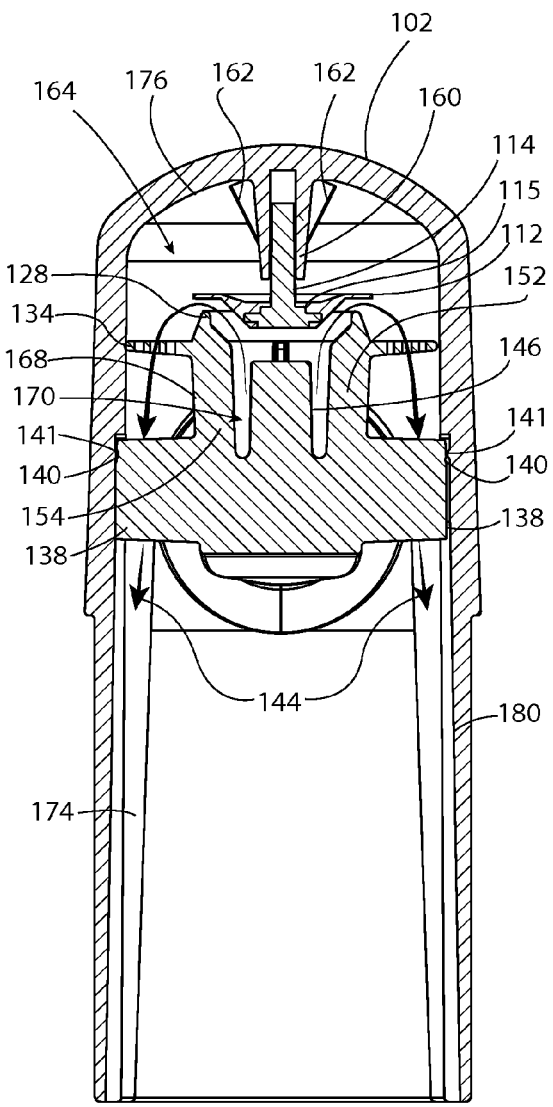
Figure 11:
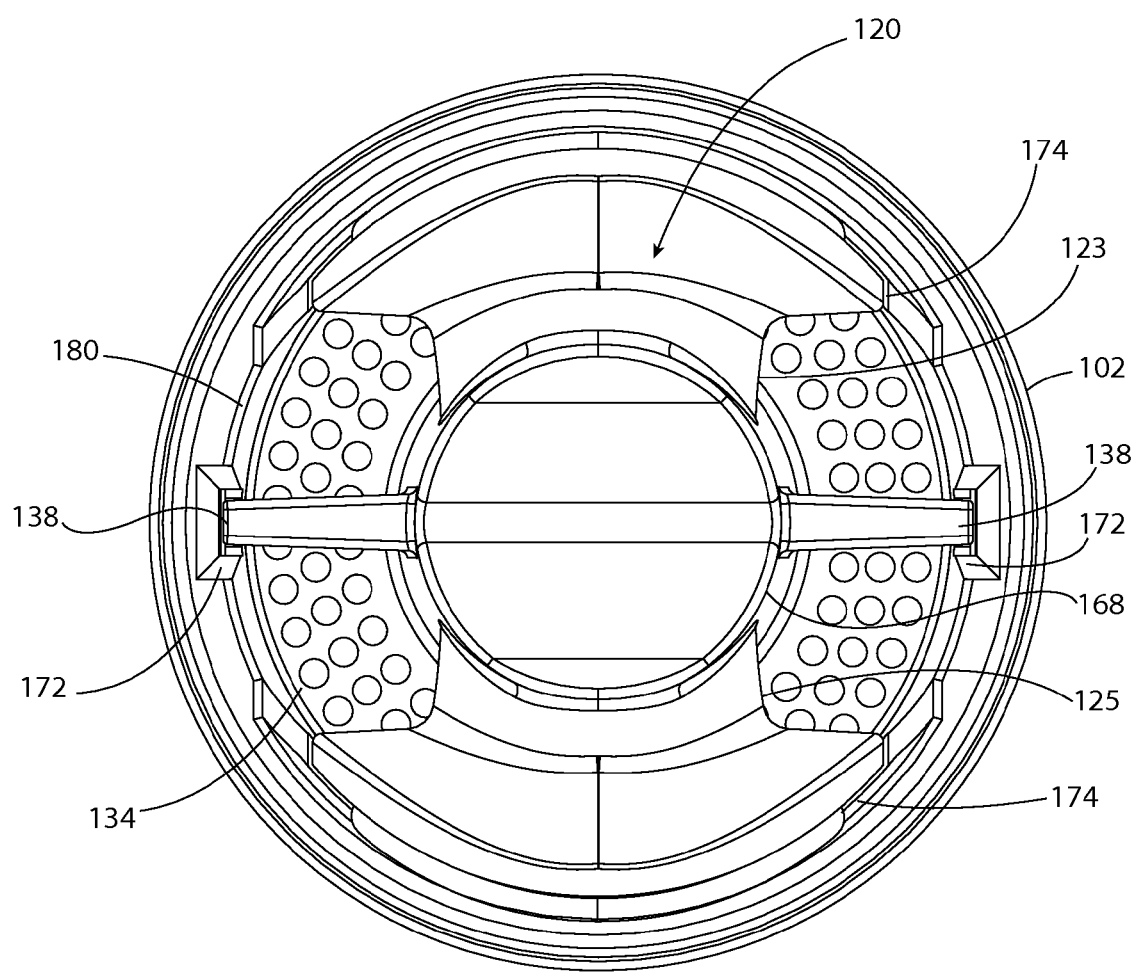
Figure 12:
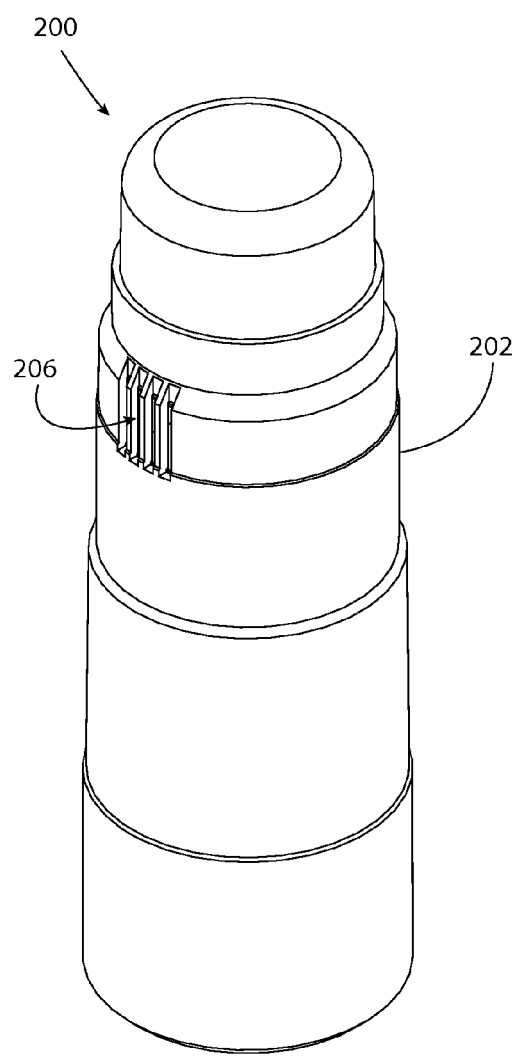
Figure 13:
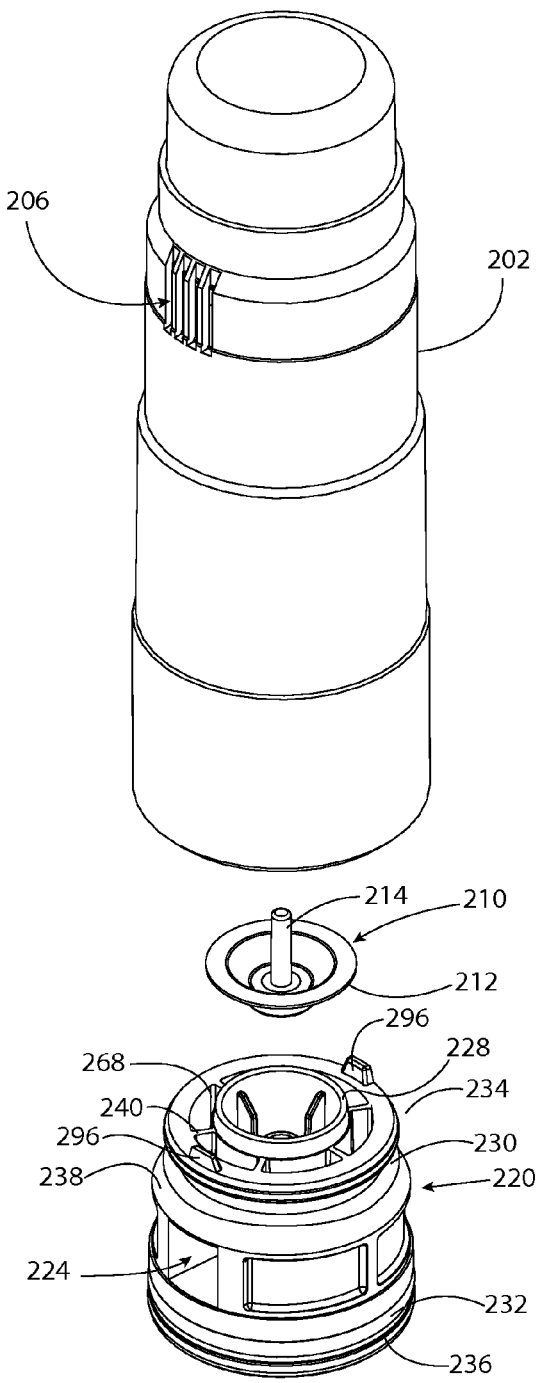
Figures 14, 15:
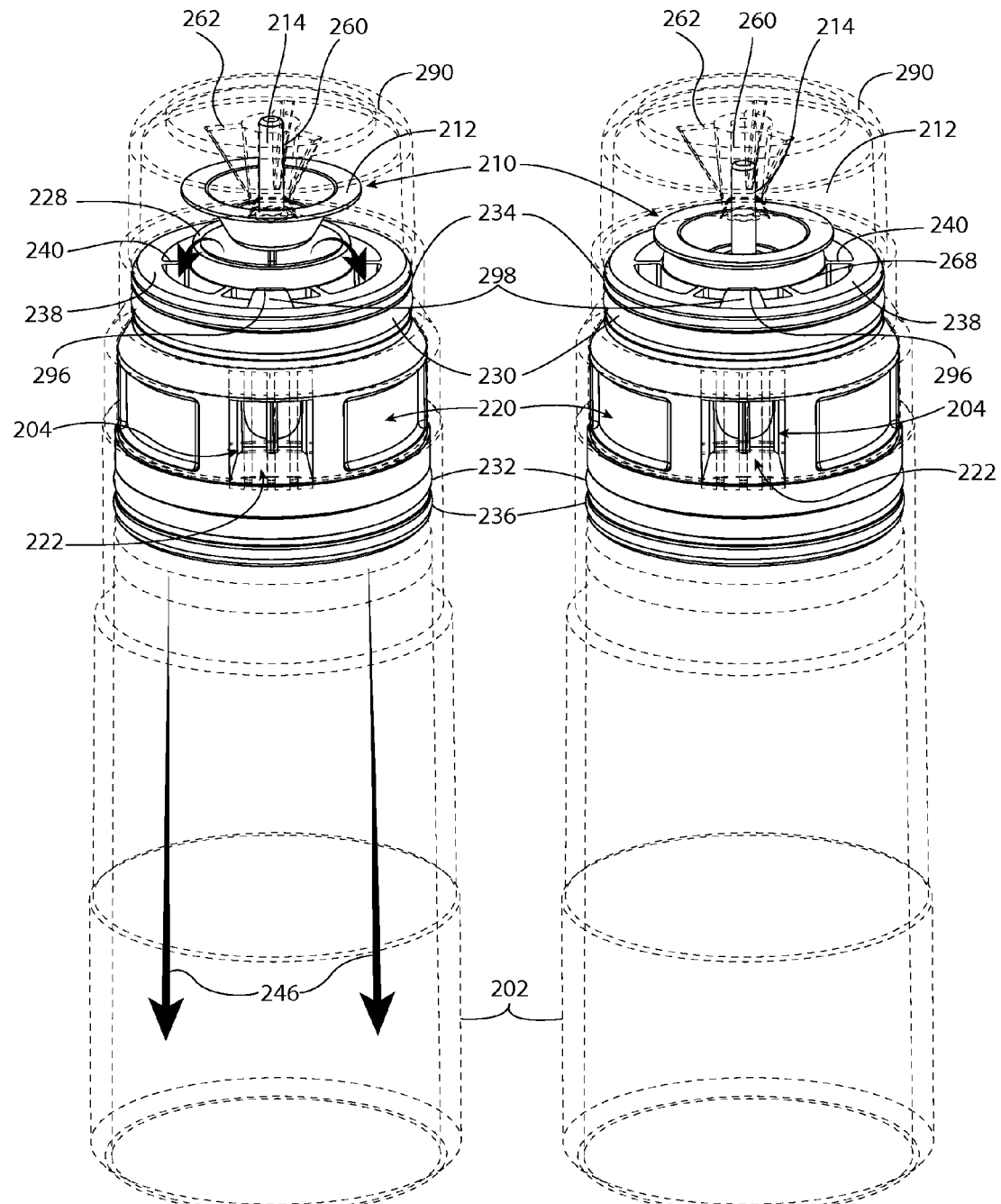
Figure 16:
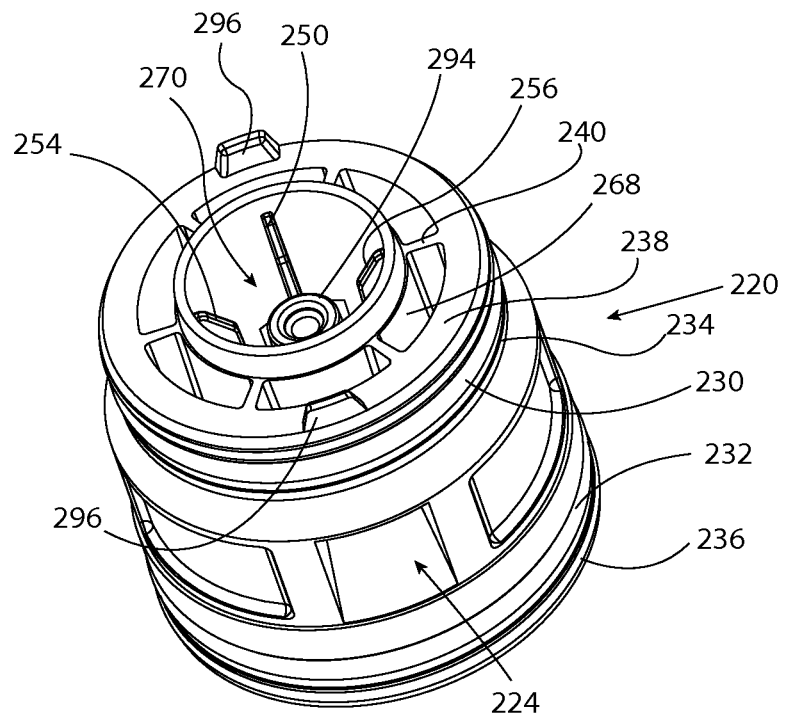
Figure 17:
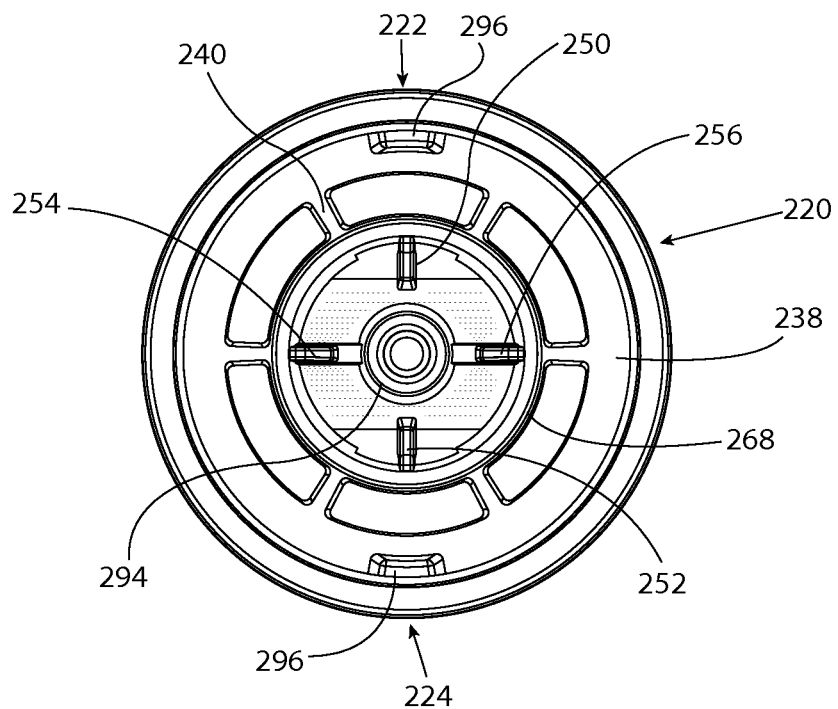
Figures 18A, 18B:
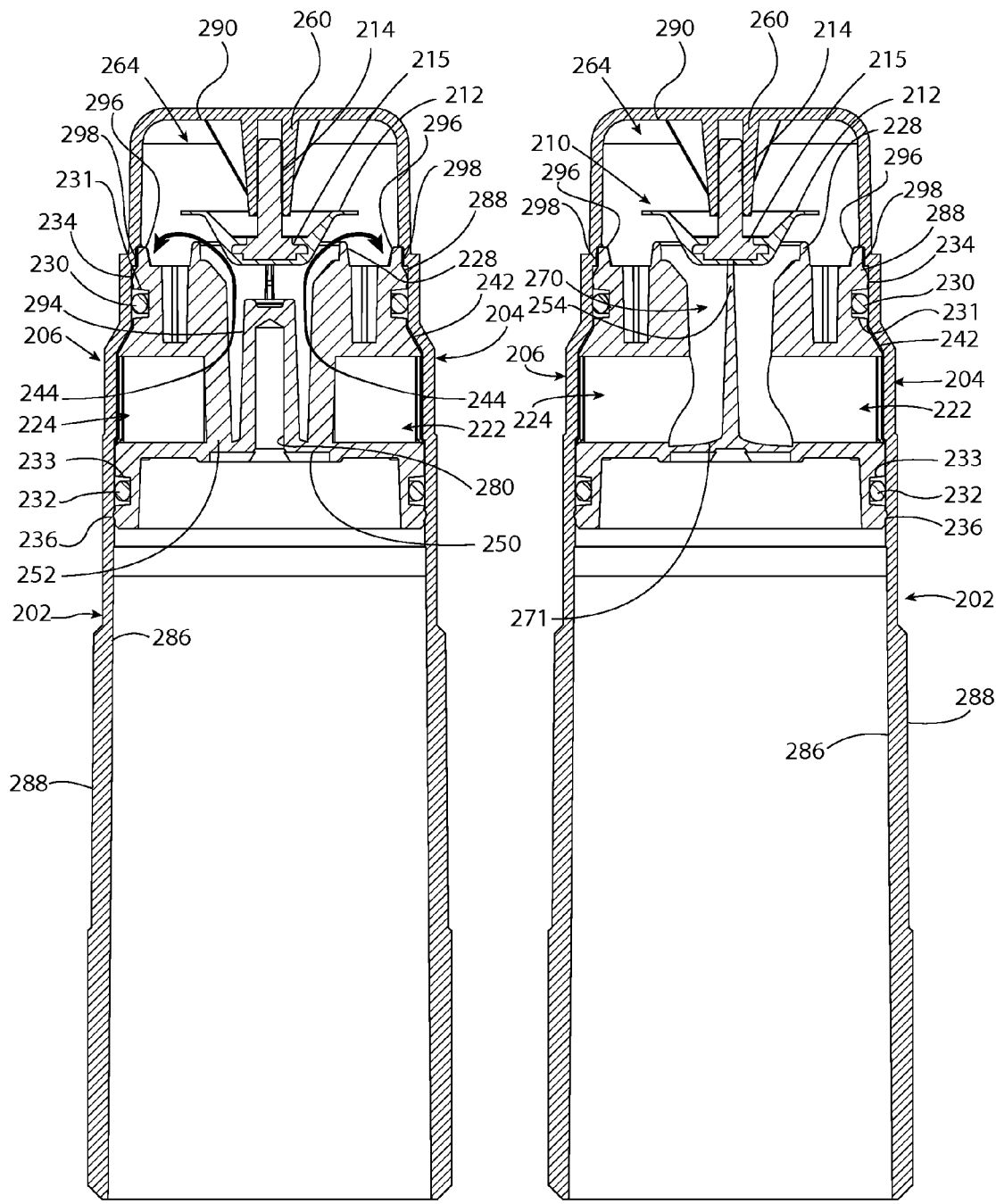
Figures 19, 20:
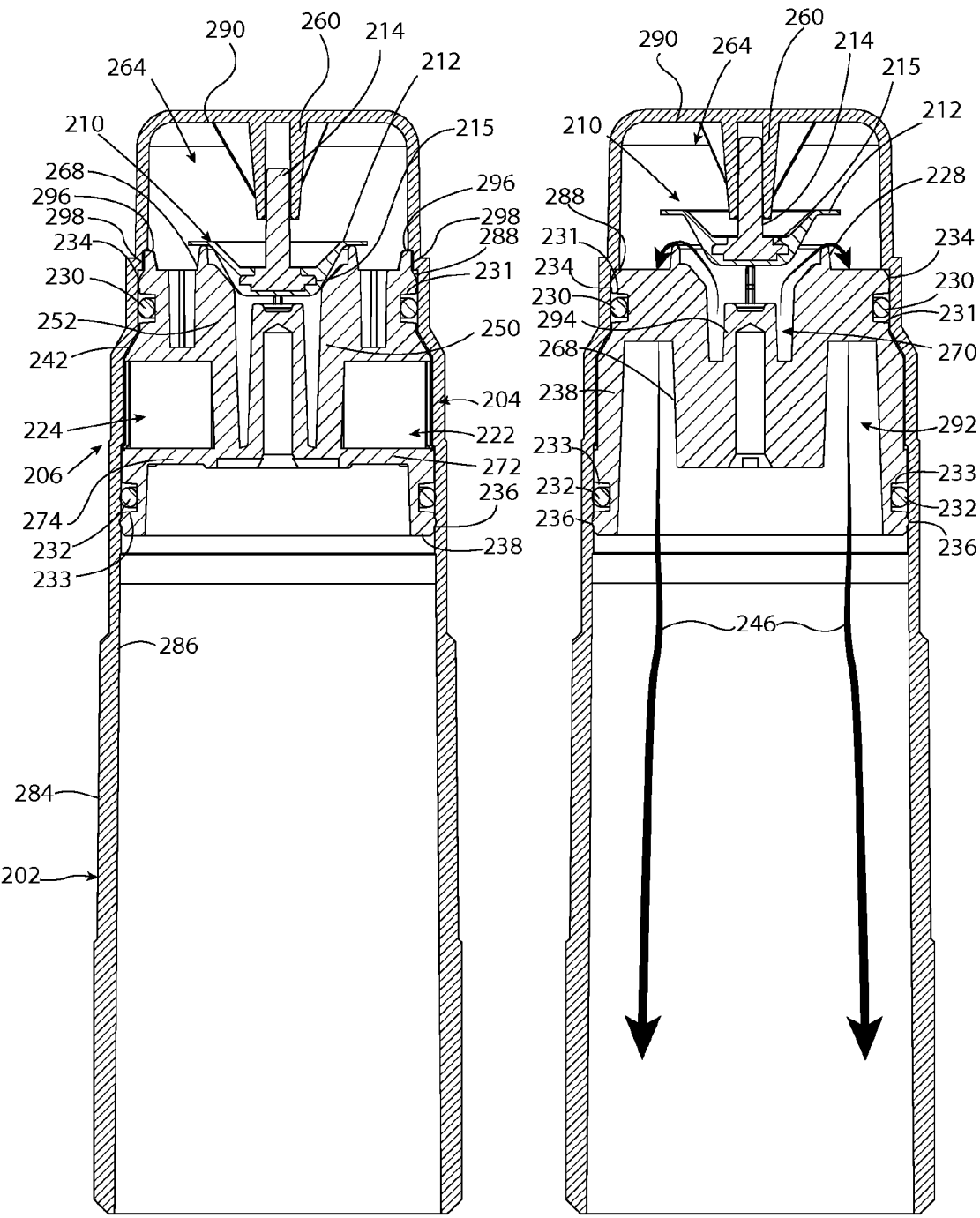
Figure 21:
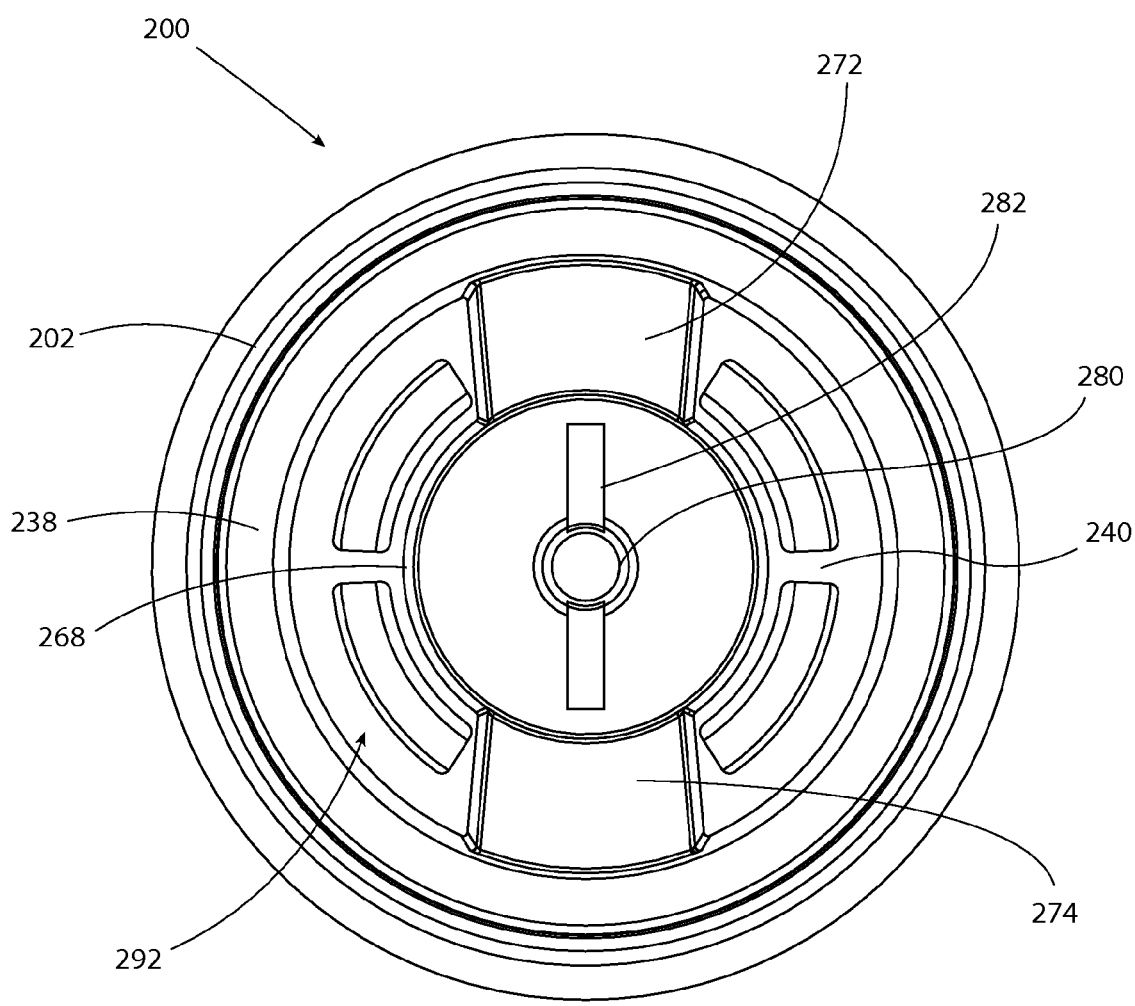

Having thus described the invention in general terms, reference will now be made to the accompanying drawings, which are not necessarily drawn to scale, and wherein:

FIG. 1 shows a perspective view of an air admittance valve in accordance with an embodiment of the present invention;

FIG. 2 shows an exploded view of the air admittance valve of FIG. 1 in accordance with an embodiment of the present invention;

FIG. 3 shows a perspective view of the air admittance valve of FIG. 1 having an open sealing member in accordance with an embodiment of the present invention;

FIG. 4 shows a perspective view of the air admittance valve of FIG. 1 having a closed sealing member in accordance with an embodiment of the present invention;

FIG. 5 shows a perspective view of a cartridge for an air admittance valve in accordance with an embodiment of the present invention;

FIG. 6 shows a top view of the cartridge of FIG. 5 in accordance with an embodiment of the present invention;

FIG. 7 shows an isometric view of the cartridge of FIG. 5 in accordance with an embodiment of the present invention;

FIG. 8a shows a cross-sectional view of the air admittance valve of FIG. 1 in accordance with an embodiment of the present invention;

FIG. 8b shows a cross-sectional view of the air admittance valve of FIG. 1 in accordance with an embodiment of the present invention;

FIG. 9 shows the cross-sectional view of FIG. 8a having the sealing member in the closed position in accordance with an embodiment of the present invention;

FIG. 10 shows a cross-sectional view of the air admittance valve of FIG. 1 in accordance with an embodiment of the present invention;

FIG. 11 shows a bottom view of the air admittance valve of FIG. 1 in accordance with an embodiment of the present invention;

FIG. 12 shows a perspective view of an air admittance valve in accordance with another embodiment of the present invention;

FIG. 13 shows an exploded view of the air admittance valve of FIG. 13 in accordance with an embodiment of the present invention;

FIG. 14 shows a perspective view of the air admittance valve of FIG. 13 having an open sealing member in accordance with an embodiment of the present invention;

FIG. 15 shows a perspective view of the air admittance valve of FIG. 13 having a closed sealing member in accordance with an embodiment of the present invention;

FIG. 16 shows a perspective view of a cartridge for an air admittance valve in accordance with an embodiment of the present invention;

FIG. 17 shows a top view of the cartridge of FIG. 17 in accordance with an embodiment of the present invention;

FIG. 18a shows a cross-sectional view of the air admittance valve of FIG. 13 in accordance with an embodiment of the present invention;

FIG. 18b shows a cross-sectional view of the air admittance valve of FIG. 13 in accordance with an embodiment of the present invention;

FIG. 19 shows the cross-sectional view of FIG. 19a having the sealing member in the closed position in accordance with an embodiment of the present invention;

FIG. 20 shows a cross-sectional view of the air admittance valve of FIG. 13 in accordance with an embodiment of the present invention; and FIG. 21 shows a bottom view of the air admittance valve of FIG. 13 in accordance with an embodiment of the present invention.

DETAILED DESCRIPTION

The present invention will now be described more fully hereinafter with reference to the accompanying drawings, in which some, but not all embodiments of the present invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

As will be described in greater detail below, the air admittance valve 100, 200 according to various embodiments of the present invention includes a housing 102, 202, a sealing member 110, 210, and a cartridge 120, 220. FIGS. 2 and 13 show exploded views of two embodiments of the present invention. In some embodiments, the housing 102, 202 and/or cartridge 120, 220 may be made of a rigid thermoplastic material, such as, for example, polyvinyl chloride (PVC), acrylonitrile butadiene styrene (ABS), propylene, or fire-rated propylene. In some embodiments, the housing 102, 202 may have a substantially cylindrical shape. In some embodiments, the housing 102, 202 may be curved at a top end and may have side walls of varying thickness. It should be noted that in other embodiments, the housing 102, 202, the cartridge 120, 220, and/or the sealing member 110, 210 may have various other configurations and are not limited to the shapes and configurations shown in the figures.

In some embodiments the air admittance valve 100, 200 may be assembled by press fit or snap fit assembly that requires no adhesives and/or sonic welding. In some alternative embodiments, the air admittance valve 100, 200 may use adhesives and/or sonic welding as an additional or alternative assembly means. The various components of the air admittance valve 100, 200 may be assembled by inserting the components into the housing 102, 202 so that the components snap or press into the housing and are frictionally secured in a modular fashion. In some embodiments, the components of the air admittance valve 100, 200 may be removed and replaced easily because of the frictional attachment. Removable and replaceable parts can extend the life span of the air admittance valve 100, 200, as well as, enhancing the reusability, adjustability, and reparability of the air admittance valve 100, 200. More delicate features of the valves 100, 200, such as the sealing members 110, 210 may be removed and replaced to ensure a good seal throughout the life of the valve.

Some embodiments of the present invention use vents 104, 106, 204, 206 to connect an external environment to the cartridge 120, 220 within the housing 102, 202. The air admittance valve 100, 200 may use any number of vents and any number of holes, slots, or other openings for each vent in order to ensure proper airflow into the valve and pipe system. In some embodiments, each vent 104, 106, 204, 206 may be any shape and may have any number of openings capable of allowing air into the inlets 122, 124, 222, 224. In some further embodiments, the vents 104, 106, 204, 206 may be designed to protect the inside of the valve 100, 200 from debris or other materials. The vents 104, 106, 204, 206 may be equipped with a filter media, such as a one way screen or other filtering device, in order to improve the filtering ability of the vents.

In some embodiments, the sealing member 110, 210 includes of a sealing portion 112, 212, which may be limited in its movement by various guide structures or may float freely within the housing 102, 202. In some embodiments, the sealing member 110, 210 may also include a guidepost 114, 214. The guidepost may interact with the housing 102, 202 of the air admittance valve 100, 200, or in some alternative embodiments, the guidepost may interact with the cartridge 120, 220 instead. The guide post 114, 214 of the sealing member 110, 210 may direct the sealing member in a substantially linear path between the open and closed positions. In the open position, the sealing member 110, 210 may move away from a sealing structure 128, 228 such that air is allowed to flow from the outside environment into the pipe system. In the closed position, the sealing member 110, 210 may engage the sealing structure 128, 228 so as to stop airflow between the pipe system and the outside environment. The sealing structure 128, 228 may be any shape that allows a seal with the sealing member 110, 210, including, but not limited to, a ring, square, rectangle, torus, bowtie, or any other shapes that facilitate a seal. Likewise, the sealing member 110, 210 need not be circular, but may be any complementary shape to the sealing structure 128, 228.

The sealing member 110, 210 may be held in a closed position by gravity, and the sealing member may be lifted off of the sealing structure 128, 228 into the open position when the pressure differential across the sealing member is enough to overcome the weight of the sealing member. In some embodiments, pressure from the pipe system may also hold the sealing member 110, 210 in the closed position when the pressure in the pipe system is greater than the pressure outside.

Some embodiments of the sealing member 110, 210 may define a support plate 115, 215 at the interface of the guide post 114, 214 and the sealing portion 112, 212 to secure the attachment between the guide post and the sealing portion, particularly if the sealing portion is made of a softer material. In some embodiments, the sealing portion 112, 212 may be overmolded onto the support plate 115, 215 and/or guide post 114, 214. In some alternative embodiments, the sealing member 110, 210 may be made of a single material and/or may be a single contiguous piece.

As will be described in greater detail herein, the cartridge 120, 220 may interact with the sealing member 110, 210 to create a one-way interface which allows air to travel into the plumbing or pipe system but not outwardly from the pipe system into the outside environment. Such a system enables the air admittance valve to equalize the pressure in the plumbing system upon discharge of waste while keeping the exterior environment sanitary at the same time.

In some embodiments, the sealing member may be made of a single material, which may be a rigid thermoplastic material, such as, for example, polyvinyl chloride (PVC), acrylonitrile butadiene styrene (ABS), propylene, fire-rated propylene, or a softer plastic or rubber-like material such as silicone or EPDM rubber. In some embodiments, the sealing member 110, 210 may be made of multiple materials. For example, a sealing portion 112, 212 of the sealing member 110, 210 may be a softer material and the guide post 114, 214 may be made of a more rigid thermoplastic material. As discussed above, the sealing portion 112, 212, in some embodiments, may be overmolded onto the guide post 114, 214 and/or the support plate 115, 215. It should be understood that sealing member 110, 210 may be made of any material or materials that can form a seal with the cartridge.

In some embodiments, the sealing member 110, 210 may be substantially circular and may engage a complementary-shaped sealing structure 128, 228 on the cartridge 120, 220. The sealing member 110, 210 may engage the sealing structure 128, 228 with a sealing surface, such as, for example, with the sealing portion 112, 212 of the sealing member. In some embodiments, the sealing member 110, 210 may have a partially "V" shaped sealing surface so that it creates a strong seal when coming to rest against the sealing structure 128, 228. In some further embodiments, as described in greater detail below, the sealing member 110, 210 may engage the sealing structure 128, 228 with a sealing surface and also have a "V" shaped protrusion to provide additional support and engage the center post 146, 294 and/or ribs 148, 150, 152, 154, 250, 252, 254, 256 more easily.

In some embodiments, the cartridge 120 is inserted into the bottom or engaging side of the housing 102 such that the entire housing may be made of a single, contiguous material. Constructing the housing as one single piece may allow the assembly to be tamper resistant, in addition to being simpler and less expensive to manufacture.

In some embodiments, the housing 102, 202 may be sufficiently long to connect directly to a joint of the pipe system where the air admittance valve is attached, thus saving on piping, pipe cutting, and adhesive costs. Alternatively, in some embodiments, the housing 102, 202 may be shortened to allow the air admittance valve to fit into tighter spaces. The housing 102, 202 of the air admittance valve 100, 200 may attach to the pipe system with threading, adhesive, press or snap fit, flexible coupling, or any other plumbing attachment means.

FIG. 1 depicts an exterior view of an embodiment of an air admittance valve 100. The figure shows an exterior view which includes a solid housing 102 having multiple vents 104, 106 designed to allow air to flow into the valve 100. In some embodiments, the vents 104, 106 may be made up of one or more holes in the wall of the housing 102. As described above, the housing 102 may be made to any length that fits the application of the user. FIG. 2 depicts an exploded perspective view of the air admittance valve of FIG. 1 showing the sealing member 110 and the cartridge 120.

With reference to FIGS. 3-4, in some embodiments, the cartridge 120 has two opposite inlets 122, 124 that are disposed within two tubes 123, 125 that may connect to a central chamber 170 (e.g. shown in FIGS. 8a-10) defined in the center of the cartridge by a central duct wall 168. As detailed above with respect to the vents 104, 106, 204, 206, the cartridge 120, 220 may have any number of inlets 122, 124 configured to allow air to flow into the pipe system. In some embodiments, the bottom 171 of the central chamber 170 may be curved in order to direct air from the inlets 122, 124 upward into the central chamber 170 as shown in FIG. 8B. The bottom 171 of the central chamber 170 improve air flow through the cartridge by providing a curved surface to direct the flow of air towards the sealing member 110 from the respective inlets. In some embodiments, the curved surface of the bottom 171 of the central chamber 170 may reduce turbulence as the air flows from the multiple inlets 122, 124 mix.

When the air admittance valve 100 is assembled, the inlets 122, 124 of the cartridge 120 may be configured to align with the vents 104, 106 such that the inlets are in fluid communication with an exterior environment. As will be described in greater detail below, a locating feature 138 and positioning feature, such as a notch 140 may interact with the housing 102 to guide and hold the cartridge 120 in alignment with the vents 104, 106.

In some embodiments, a pair of gaskets 130, 132 may be configured to seal the cartridge against the wall of the housing 102 such that the air must be directed into the inlet 122, 124 from the exterior environment. In some embodiments, the gaskets 130, 132 prevent air from leaking into the pipe system at the interface between the housing and the cartridge. In some embodiments, the air admittance valve 100 may use standard O-rings, washers, or other similar sealing mechanisms as the gaskets 130, 132. In some alternative embodiments, adhesives, epoxies, resins, sonic welding, or other sealing means may be used in place of the gaskets 130, 132.

The sealing member 110 may interact with an outlet defined by a sealing structure 128 at an upper end of the central duct wall 168 to allow air to flow from the central chamber 170 into an end chamber 164 when the sealing member 110 is in an open position as shown in FIG. 3. When in the open position, in some embodiments, the sealing member 110 moves away from the sealing structure 128 in order to allow air to flow into the end chamber 164. In some embodiments, the sealing member 110 may move into the open position when there is a negative pressure in the pipe system. The sealing member 110 may be held closed by gravity and may be opened when there is a sufficiently large pressure differential between the exterior environment and the pipe system to overcome the weight of the sealing member.

In some embodiments, the sealing member 110 may be closed when the pressure in the pipe system equals and/or exceeds the pressure in the outside environment. In this embodiment, odors and other substances within the pipe system cannot escape into the outside environment because the sealing member closes rather than allowing the pipe system to vent outside. In some embodiments, the air admittance valve is oriented so that the sealing member 110 may be assisted into the closed position by gravity. In some embodiments, the pressure from the pipe system holds the sealing member 110 in the closed position when it exceeds the pressure in the outside environment.

In some embodiments, the vents 104, 106, inlets 122, 124, and central chamber 170 are in fluid communication with the exterior environment such that the pressure inside the central chamber 170 is substantially the same as the pressure in the outside environment. Thus, the pressure against the lower side of the sealing portion 112 of the sealing member 110 may be determined by the exterior environment.

In some embodiments, the end chamber 164 may be in fluid communication with the pipe system by a void 182 around the exterior of the cartridge between the cartridge 120 and the housing wall. In some embodiments, the upper end of the housing 102 may define a curved top 176 that encompasses the end chamber 164. The curved top 176 may partially direct the airflow 144 from the central chamber 170 and into the pipe system when the sealing member 110 is in an open position. In some alternative embodiments, the top of the housing may instead be flat. In some embodiments the pipe system may be in fluid communication with the end chamber 164 the pressure of the air against the top of the sealing portion 112 may be substantially the same as the pressure inside the pipe system. Thus, in some embodiments, the pressure in the pipe system against the top of the sealing portion 112 and the pressure from the outside environment against the bottom of the sealing member may oppose one another to either open or close the sealing member, depending, respectively, on whether the exterior pressure is greater or less than the pressure in the pipe system respectively. FIGS. 3-4 show the sealing member 110 in the open and closed positions.

With reference to FIG. 5, the cartridge in accordance with various embodiments of the invention is shown in detail. Inside the central chamber of the cartridge 170, which is defined by the central duct wall 168, there may be multiple ribs 148, 150, 152, 154 which may support the sealing member 110 and help direct airflow through the cartridge 120. In some embodiments, the center of the central chamber 170 may have a center post 146. As described in greater detail below, the central post 146 and/or the ribs 148, 150, 152, 154 may support the sealing member 110 when a positive pressure is exerted on the sealing member from the pipe system so that the sealing member does not collapse into the central chamber, thus breaking the seal of the air admittance valve 100.

With reference to FIG. 6, a top view of the cartridge is shown in accordance with an embodiment of the present invention. Ribs 148, 150, 152, 154 can be seen connecting the walls of the central duct wall 168 with the central post 146. Any number of ribs may be used in the cartridge depending on the desired air flow and the desired support for the sealing member 110. In some embodiments, the ribs 148, 150, 152, 154 are used to control turbulence and smooth the airflow through the valve assembly 100. Two of the ribs 148, 150 shown in FIG. 6, may lie in the path of the inlet 122, 124 into the central chamber 170. In some embodiments, the ribs 148, 150, 152, 154 may be placed in the inlets 122, 124 or may be designed to avoid the inlets to create the desired support and/or air flow and reduce turbulence caused by the intersecting air streams. With reference to FIG. 7, the edges of the ribs 148, 150 placed within the inlets 122, 124 may be tapered or sharpened in order to improve air flow through the cartridge.

As will be described in greater detail below, the cartridge may also include locating features 138 that are designed to align and guide the cartridge 120 into and out of the housing 102 in order to ease the assembly process. The locating features 138 may also include a notch 140 or other similar positioning feature that enables the cartridge to be secured at a desired position within the housing, i.e., by interacting with a corresponding notch or positioning feature in the housing.

FIGS. 8a-10 show cross-sectional views of the air admittance valve 100 in accordance with various example embodiments of the present invention. In the embodiments shown in FIGS. 8a-10 features such as the vents 104, 106 may have portions removed for exemplary purposes; however, in some embodiments, the vents 104, 106 have openings across a majority of the surface area of the inlets 122, 124. FIG. 8a shows a central cross-section of the valve 100 having a cartridge 120 in accordance with an embodiment of the present invention, such that the ribs 148, 150 in the inlet are shown as well. In some embodiments, entering air flow 142 travels into the inlets 122, 124 through inlet openings 156, 158 which may be placed adjacent to the vents 104, 106 in the housing 102, when the cartridge is in position. The air flow 142 enters the inlet opening and travels into the central chamber 170 and upward into the end chamber 164. In some embodiments, the sealing member 110 is made up of a sealing portion 112 and a guide post 114 as shown in FIG. 8a. The guide post may interact with a hollow seal guide 160 in the housing top 176 that may limit the motion of the sealing member 110 to a single vertical axis. In some embodiments, and as shown in FIG. 8a, the hollow seal guide 160 may be a complementary shape to the guide post 114, such as, for example, a cylinder. In some embodiments, the guide may be supported by substantially triangular struts 162. In some alternative environments, the guide post may be attached to the housing and the hollow guide may be disposed on the sealing member.

As detailed above, in some embodiments, the sealing portion 112 of the sealing member 110 may be made of a soft material to enable a better seal between the sealing member 110 and the sealing structure 128. In some embodiments, the guide post 114 may be made of a more rigid material than the sealing portion to enable smoother communication between the guide post 114 and the hollow guide 160 and may be made of a harder plastic or similar material.

FIG. 8b shows an embodiment of the air admittance valve 100 shown in FIG. 8a where the cross-section is offset so that the ribs disposed within the inlets 122, 124 are not visible. The air flow entering the cartridge may travel from the inlet opening 156, 158 into the central chamber 170 and out the outlet of the central chamber into the end chamber 164.

As previously discussed, a pair of gaskets 130, 132 may be disposed around the junction between the cartridge and the housing such that air is not allowed to escape between the cartridge and the housing into the pipe system. In some embodiments, the gaskets 130, 132 may be held in place by corresponding slots 131, 133 in the cartridge and/or in the housing 102. In some embodiments, these slots 131, 133 may be positioned around the inlet openings 156, 158 and may hold the gaskets 130, 132 in place.

In some embodiments, an internal communication wall 134 may be positioned at or near one end of the cartridge 120 to align the cartridge within the housing 102 and aid in controlling the flow of air through the air admittance valve. The internal communication wall 134 may assist with aligning the cartridge 120 with the housing 102 during installation. In some embodiments, the internal communication wall 134 may allow air to flow freely from the end chamber to the pipe system around the tubes 123, 125 which contain the inlets 122, 124. In some embodiments, the air may travel in the void 182 between the cartridge and the housing 102 with the air flow path 144 created by the combination of the housing 102 and the cartridge 120. In some embodiments, the internal communication wall 134 may use holes or openings as a mesh-like surface in order to protect the inside of the valve 100 from debris or other materials. In some alternative embodiments, the internal communication wall 134 may have wider openings or the cartridge 120 may not have an internal communication wall.

With reference to FIG. 10, a cross-section of an embodiment of the air admittance valve 100 is shown at a ninety degree angle to the cross-sections shown in FIG. 8a and FIG. 8b. In the cross section of this embodiment, the locating features 138 are shown having the notches 140 engaging with the wall of the housing 102.

FIGS. 3 and 8a show views of an embodiment of the air admittance valve 100 showing the air paths 142, 144 through the valve. The entering air 142 may travel through the inlets 122, 124. The air 142 is then directed into the central chamber 170, where the pressure within the central chamber and the corresponding negative pressure in the end chamber 164 opens the sealing member 110 and allows the exiting air 144 to flow into the end chamber 164. Once inside the end chamber 164, the air travels around the cartridge and down into the pipe system. In the embodiment shown in FIG. 3 the exiting airflow 144 travels in the void 182 between the central duct wall 168 and the housing 102.

FIG. 11 shows a bottom view of an embodiment of the present invention. In FIG. 11, the housing 102 may have numerous slots and cutaways 172, 174 that help direct and hold the cartridge 120 and the sealing member 110 in the correct positions within the valve assembly 100. The locating feature 138 may travel in a locating slot 172 until the notch 140 or other positioning feature engages with a corresponding positioning feature 141 (shown in FIG. 10) in the housing 102. Likewise, the inlet openings 156, 158, which are connected to the tubes 123, 125 may fit into slots or deformations 174 in the housing 102 which help to guide and align the cartridge 120 within the housing 102. In some embodiments, the slots 172, 174 may help align the rotational position and axial position of the cartridge 120 and particularly the inlet openings 156, 158 with the vents 104, 106 in the housing 102. The locating feature 138, in some embodiments, may include a lock or locking mechanism to at least partially prevent disassembly of the air admittance valve 100.

In some embodiments of the present invention, the internal wall 180 of the housing 102 may be tapered so that the diameter of the housing decreases the closer the cartridge 120 gets to its final position. A tapered housing 102 may allow the cartridge to be held more firmly in the housing, while at the same time easing the assembly process and ensuring the gaskets 130, 132 stay in position. The tapered housing 102 may additionally or alternatively assist with a molding process by making the housing easier to remove from a mold. In some embodiments, the tapered housing 102 may allow the housing to engage a standard pipe size at a bottom end and still allow the cartridge 120 to slide into and rest in the top end. In the embodiments in which the housing 102 is uses threading to engage the pipe system, the internal diameter of the housing may be sufficiently wide at the threaded end, due to the taper, that the cartridge 120 does not catch on the threads during assembly. In some embodiments, there may be a stopper or lip that limits the vertical movement of the cartridge 120. In some embodiments, the slots 172, 174 may naturally terminate at the correct cartridge 120 position in the housing 102. In some embodiments, the notch 140 or other similar positioning feature may allow the cartridge 120 to snap into and be held in the proper vertical and angular positions.

In some embodiments, the cartridge 120 is positioned within the housing 102 to allow the sealing member 110 to operate properly. Some embodiments of the sealing member 110 must be allowed to move between the open and closed positions while, at the same time, not separating the guide posts 114 from the hollow guide 160. A lip and/or taper may be configured to hold the cartridge 120 at a desired distance from the top of the housing 176.

With reference to FIG. 12, another embodiment of the present invention is shown. FIG. 12 depicts an exterior view of the housing 202 of an air admittance valve 200. The housing 202, in some embodiments, may have a plurality of vent slots 204, 206 that allow air into the pipe system from the exterior environment. In some embodiments, vents 204, 206 may be slot-shaped with elongate vertical or horizontal openings. As detailed above, the housing 202 may have a substantially cylindrical shape, and may have a curved top and/or variations in the thickness of the walls of the housing. In some embodiments, the housing 202 may have a series of stepped ridges along its outer surface. Some embodiments of the housing 202 of the air admittance valve 200 may have a varying wall thickness in order, for example, to minimize manufacturing costs while maintaining the strength of the valve at key structural locations. The housing 202 may have a varying or tapered thickness in order to ease removal from a mold and/or to ease the assembly process by allowing the cartridge to slide unimpeded through the lower section of the housing. In some embodiments, the housing 202 may vary in thickness to allow the bottom of the housing to engage a standard pipe size while the top of the housing may be shaped to accommodate standard size gaskets 230, 232 (e.g. standard size O-Rings) around the cartridge 220. In the embodiments in which the housing 202 is uses threading to engage the pipe system, the internal diameter of the housing may be sufficiently wide at the threaded end, due to the taper or varied thickness, that the cartridge 220 does not catch on the threads during assembly. Also as detailed above, the housing 202 may be longer or shorter as needed by the user to couple with the pipe system. FIG. 13 depicts an exploded perspective view of the embodiment of the air admittance valve 200 of FIG. 12 showing the sealing member 210 and the cartridge 220.

FIGS. 14-15 illustrate a housing 202, sealing member 210 and cartridge 220 in accordance with some embodiments of the present invention. In the embodiment shown in FIGS. 14-15, the cartridge 220 has two opposite inlets 222, 224 that enter the side of the cartridge and a central chamber 270 within a central duct wall 268. In some embodiments, however, the cartridge 220 may have any number of inlets. The sealing structure 228 of the cartridge 220 may engage a sealing member 210 in order to create a one-way valve configuration. As detailed above, the sealing member 210 may include a sealing portion 212 in some embodiments and, in some further embodiments, may include a guide post 214. In some embodiments, the sealing member 210 may be closed when the pressure in the pipe system equals and/or exceeds the pressure in the outside environment. In this embodiment, odors and other substances within the pipe system cannot escape into the outside environment because the sealing member closes rather than allowing the pipe system to vent outside. In some embodiments, the air admittance valve is oriented so that the sealing member 210 may be assisted into the closed position by gravity. The pressure from the pipe system may hold the sealing member 210 in the closed position when it exceeds the pressure in the outside environment. In some embodiments, the cartridge may have multiple concentric duct walls 238, 268 which allow air to flow between them after traveling between the open sealing member 210 and the sealing structure 228.

In the embodiments shown in FIG. 14-15, when the sealing member 210 is in an open position, entering air 244 flows into the inlets 222, 224 via the vents 204, 206 in the housing 202, through the central chamber 270 into the end chamber 264 of the air admittance valve 200, and down into the pipe system. In some embodiments, the cartridge 220 may have two concentric duct walls 238, 268 with a void therebetween. In some embodiments, the inlets 222, 224 pass through the outer duct wall 238 and through the central duct wall 268 to allow air to flow directly from the exterior environment to the central chamber 270. In some embodiments, the void 292 between the central duct wall 268 and the outer duct wall 238 may allow the end chamber 264 to be in fluid communication with the pipe system. In the embodiment shown in FIGS. 14-15, the airflow 246 exiting the central chamber passes through the void 292 between the outer 238 and central duct wall 268 of the cartridge 220. Some embodiments may use support structures 240 between the central duct wall 268 and the outer duct wall 238. Some further embodiments may use a mesh or similar structure between the two duct walls 238, 268.

As described above, in some embodiments, the inlets 222, 224 and the central chamber 270 are in fluid communication with the outside environment, such that their pressures substantially match that of the outside environment. Likewise, in some embodiments, the end chamber 264, the void 292, and the pipe system are also in fluid communication, such that the pressure in the end chamber 264 substantially matches that of the pressure in the pipe system. Thus, in some embodiments, when the pressure in the exterior environment, and thus in the central chamber 270, is greater than the pressure in the pipe system, and thus the end chamber 264, the sealing member 210 is moved into an open position to allow the pressures to substantially equalize. As described above, in some embodiments, when the pressure in the pipe system is greater than the pressure in the exterior environment, the sealing member is held in a closed position, such as in the embodiment shown in FIG. 15.

In some embodiments, the upper end of the housing 202 may define a curved top 290 that encompasses the end chamber 264. The curved top 290 may partially direct the airflow 244 from the central chamber and into the pipe system when the sealing member 210 is in an open position. In some alternative embodiments the upper end of the housing 202 may instead be flat.

With reference to FIGS. 16-17, in some embodiments, the cartridge may have multiple ribs 250, 252, 254, 256 that direct air flow through the central chamber 270, as well as support the sealing member 210 and the structure of the cartridge 202. The cartridge 202 may also have a center post 294, in some embodiments, that is configured to support the sealing member 210 in the event of a positive pressure from the pipe system. In some embodiments, one or both of the center post 294 and the ribs 250, 252, 254, 256 may support the sealing member 210 and prevent it from being pushed into the central chamber by gravity and/or the pressure in the pipe system.

In some embodiments, the bottom 271 of the central chamber 270 may be curved in order to direct air from the inlets 222, 224 upward into the central chamber 270 as shown in FIG. 17. The bottom 271 of the central chamber 270 improve air flow through the cartridge by providing a curved surface to direct the flow of air towards the sealing member 210 from the respective inlets. In some embodiments, the curved surface of the bottom 271 of the central chamber 270 may reduce turbulence as the air flows from the multiple inlets 222, 224 mix.

FIGS. 18a-20 show cross-sectional views of the air admittance valve 200 in accordance with various example embodiments of the present invention. In the embodiments shown in FIGS. 18a-20 features such as the vents 204, 206 may have portions removed for exemplary purposes; however, in some embodiments, the vents 204, 206 have openings across a majority of the surface area of the inlets 222, 224. As shown in FIG. 18a, the central post 294 of the cartridge 220 is located in line with the travel path of the sealing member 210. As discussed above, if a positive pressure is placed on the sealing member 210, the central post 294 and/or the ribs 250, 252, 254, 256 may prevent the sealing member 210 from collapsing into the central chamber 270. In some embodiments, the central post 294 may be positioned to contact the sealing member 210 whenever the sealing member is in a closed position. In some other embodiments, the sealing member 210 may be spaced a small distance from the central post 294, such that the central post only contacts the sealing member 210 when a positive pressure is applied.

In some embodiments, pair of gaskets 230, 232 may be disposed around the junction between the cartridge and the housing such that air is not allowed to escape between the cartridge and the housing into the pipe system. In some embodiments, the gaskets 230, 232 may be held in place by corresponding slots 231, 233 in the cartridge and/or in the housing 102. In some alternative embodiments, the gaskets 230, 232 may rest on upward-facing surfaces of the cartridge 220 so that the insertion of the cartridge into the housing 202 forms a compression seal. In some embodiments, the gaskets 230, 232 may be positioned concentrically around the outer duct wall 238 above and below the inlets 222, 224 such that air may not flow into the pipe system or end chamber 264 without traveling through the central chamber 270. In the embodiments shown in FIGS. 14-15, the gaskets 230, 232 are concentric with the duct walls 238, 268 and prevent air from flowing around the outer duct wall and into the pipe system in order to create the pressure differential and force air to act on the sealing member 210. In some embodiments, the air admittance valve 200 may use standard O-rings, washers, or other similar sealing mechanisms as the gaskets 230, 232. In some alternative embodiments, adhesives, epoxies, resins, sonic welding, or other sealing means may be used in place of the gaskets 230, 232.

With reference to FIG. 18b, a cross-section is shown where the cross-section is taken offset from a center line of the housing and cartridge, such that the ribs 150, 152 disposed within the inlets 222, 224 are not shown. In some embodiments, there may not be ribs disposed within the inlets 224, 224 depending on the desired support and/or air flow through the cartridge 220. In some alternative embodiments, the ribs 250, 252 may be positioned in the inlets 222, 224 in order to reduce turbulence of the air flowing into the cartridge.

With reference to FIG. 19, a cross-section of the air admittance valve 200 is shown in accordance with an embodiment of the present invention that has support structures 240 (as shown in FIGS. 16-17) extending between the outer duct wall 238 and the central duct wall 268. As shown and described above, the end chamber 264 may be in fluid communication with the pipe system because of the void 292 between the outer 238 and central 268 duct walls.

As discussed above, the side walls of the housing 202 may also be tapered or stepped in order to ease assembly and/or molding, for example, so that the cartridge 220 does not engage the housing until it is close to the proper alignment (thus reducing wear on the gaskets 230, 232), or the housing may be able to slide off a mold easier. In some embodiments, the housing 202 may be have a more defined, tapered section 242 in order to axially position the cartridge 220 within the housing. The cartridge 220 may have a corresponding taper. In some embodiments, the housing 202 may have a lip 288 that restricts the axial movement of the cartridge within the housing. The purpose of the tapering 242 and/or lip 288 features is to ensure axial alignment of the vents 202, 204 and the inlets 222, 224, as well as to ensure proper operation of the sealing member 210. The sealing member 210 must allowed to freely move between the open and closed positions while, at the same time, not dislodging the guide posts 214 from the hollow seal guide 260. The lip 288 and/or taper 242 may be configured to hold the cartridge 220 at a desired distance from the top of the housing 290. As described above, in some embodiments, the housing may interact with the cartridge via one or more gaskets 230, 232.

In some further embodiments, the cartridge 220 is tapered so that it corresponds to the taper 242 in the housing 202 and one end of the cartridge has a smaller diameter than the other. The cartridge 220 may be tapered such that it is held at a predetermined distance from the end of the housing 290. In some embodiments, upper gasket 230 of the cartridge has a narrower diameter, corresponding to the taper, than the lower gasket 232. The upper gasket 230 may additionally or alternatively have a narrower diameter so that the gasket does not contact the vents 204, 206 as the cartridge 220 is inserted into the housing 202. As described above, in some embodiments, the housing may have an inner 286 and an outer 284 wall. The inner wall may taper inward the closer the cartridge 220 gets to the top of the housing 290, such that the cartridge 220 is easy to insert into the housing 202, but remains in position once inserted.

In some embodiments, the cartridge 220 may be further configured with positioning features, such as, for example, alignment bumps 234, 236 that help to position and align the cartridge 220 when it is inserted into the housing. As shown, for example, in FIGS. 18a-18b, one or more of the positioning features 234, 236 may engage with one or more corresponding positioning features in the housing to hold the cartridge 220 in a desired axial position. For example, as shown in FIGS. 18a-18b, the lower positioning feature 236 engages a corresponding positioning feature, such as a groove in the housing 202, while the upper positioning feature 234 rests against the inner wall 286 of the housing. The one or more corresponding positioning features may engage one or more of the positioning features 234, 236 to lock the cartridge 220 in a desired position to facilitate a snap-fit assembly.

Additionally or alternatively, the cartridge 220 may have one or more locating features, such as, for example, alignment tabs 296 that may position the cartridge rotationally and/or axially within the housing. As shown in FIGS. 13-19, one or more tabs 296 may protrude from the top of the cartridge and engage corresponding slots 298 in the housing. The slots 298 may be adjacent to the lip 288 such that the tabs 296 rotationally and axially hold the inlets 222, 224 in alignment with the vents 204, 206 of the housing 202. In some embodiments, the tabs 296 may additionally or alternatively have locking features that engage the housing 202 to resist removal of the cartridge 220 from the housing.

FIGS. 14 and 18a show views of an embodiment of the air admittance valve 200 showing the air paths 244, 246 through the valve. In the embodiment shown in FIG. 18a, the entering air 244 may travel through the inlets 222, 224. The air may then be directed into the central chamber 270, where the pressure difference between the central chamber and the end chamber 264 opens the sealing member 210 and allows the exiting air 246 to flow into the end chamber 264. Once inside the end chamber 264, the air may travel through the cartridge and down into the pipe system. In the embodiment shown in FIG. 14 the exiting airflow 246 travels in the void 292 between the central duct wall 268 and the outer duct wall 238.

FIG. 21 shows a bottom view of the air admittance valve 200, in accordance with an embodiment of the present invention. In some embodiments, the bottom of the central duct wall 268 may have a shaft 280 corresponding with the central post 294, to lighten and reduce material costs for manufacturing the central shaft. The shaft 280 may also have one or more slots 282 to aid with alignment and positioning of the cartridge 220 during assembly. In some embodiments, the shaft 280 and/or slots 282 may facilitate removal of the cartridge 220 during disassembly, such as, for example, by being tapped or threaded to allow the cartridge to be pulled outward from the housing.

As a result, and among other benefits, the present invention improves the air admittance valve design by providing an air admittance valve 100, 200 having a modular, tamper-resistant, repairable, durable, easy to manufacture design with improved performance.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

What is claimed is:

1. An air admittance valve configured, when subjected to a negative pressure condition, to vent a pipe system to an ambient environment, the air admittance valve comprising:
   a housing defining a first end and a second end opposite the first end, the housing comprising:
      at least one vent disposed in a wall of the housing;
      wherein the housing is configured to be engaged with the pipe system at the first end;
   a cartridge comprising:
      at least one inlet defining at least one inlet opening, wherein the at least one inlet is connected to a central chamber;
      an opening of the central chamber having a sealing structure;
   a sealing member defining a sealing surface;
      wherein the sealing member is configured to move between a closed position and an open position;
      wherein the sealing surface is configured to interact with the sealing structure of the cartridge to allow one-way airflow from the central chamber to the pipe system;
   wherein an internal diameter of the housing at the first end is greater than a maximum external diameter of the cartridge,
   wherein the cartridge is configured to be inserted within the housing at the first end, such that the at least one inlet opening is configured to substantially align with the at least one vent in the housing, and
   wherein the internal diameter of the housing at the at least one vent in the wall of the housing is less than the internal diameter of the housing at the first end such that the wall of the housing is configured to retain the cartridge.

2. The air admittance valve of claim 1, wherein the cartridge is removable such that the cartridge is configured to be replaced without damaging or disassembling the housing.

3. The air admittance valve of claim 1, wherein the sealing member further comprises a guide portion and the housing further defines a seal guide; and
   wherein the seal guide is configured to movably engage the guide portion.

4. The air admittance valve of claim 1, further comprising:
   at least one gasket configured to be disposed between the cartridge and the housing to prevent airflow from bypassing the at least one inlet of the cartridge.

5. The air admittance valve of claim 1, further comprising:
   an internal communication wall configured to align the cartridge with an interior of the housing,
   wherein an end chamber is defined between the cartridge and a second end of the housing when the cartridge is disposed within the housing, and
   wherein the internal communication wall defines at least one opening such that the internal communication wall is configured to fluidly connect the end chamber with the pipe system.

6. The air admittance valve of claim 1, further comprising:
   a central post within the central chamber configured to restrict the movement of the sealing member into the central chamber when subjected to a positive pressure from the pipe system.

7. The air admittance valve of claim 1, further comprising:
   a locating feature on the cartridge and a corresponding locating slot on the housing configured to guide the cartridge into alignment with the at least one vent during insertion of the cartridge into the housing.

8. The air admittance valve of claim 1, further comprising:
   a positioning feature on the cartridge and a corresponding positioning feature on the housing configured to hold the cartridge in alignment with the at least one vent after insertion of the cartridge into the housing.

9. The air admittance valve of claim 1, wherein the cartridge further comprises:
   a duct wall that defines the central chamber in an interior of the duct wall; and
   at least one inlet tube defining the at least one inlet, such that the at least one inlet tube spans between the at least one vent of the housing and the duct wall when the cartridge is inserted within the housing.

10. The air admittance valve of claim 9, further comprising:
    a void between the duct wall and an inner wall of the housing in fluid communication with an end chamber and the pipe system, and
    wherein the void is only in fluid communication with the at least one inlet and central chamber when the sealing member is in the open position.

11. The air admittance valve of claim 1, wherein the cartridge further defines
    an inner duct wall and a concentric outer duct wall, wherein an interior of the inner duct wall defines the central chamber, wherein the at least one inlet opening is defined in an outer surface of the outer duct wall and the at least one inlet connects the outer surface of the outer duct wall with the central chamber, such that the outer surface of the outer duct wall is in fluid communication with the central chamber.

12. The air admittance valve of claim 11, further comprising:
    a void between the inner duct wall and the outer duct wall in fluid communication with an end chamber and the pipe system, and
    wherein the void is only in fluid communication with the at least one inlet and central chamber when the sealing member is in the open position.

13. The air admittance valve of claim 1, wherein the cartridge further defines
    at least one curved surface configured to direct airflow from the at least one inlet toward the sealing member.

14. The air admittance valve of claim 13, wherein the at least one curved surface is defined on a bottom surface of the central chamber proximate the at least one inlet.

* * * * *